Sept. 18, 1945.　　R. E. SCHNEIDER　　2,385,235
STYRENE DISTILLATION
Filed Oct. 26, 1942
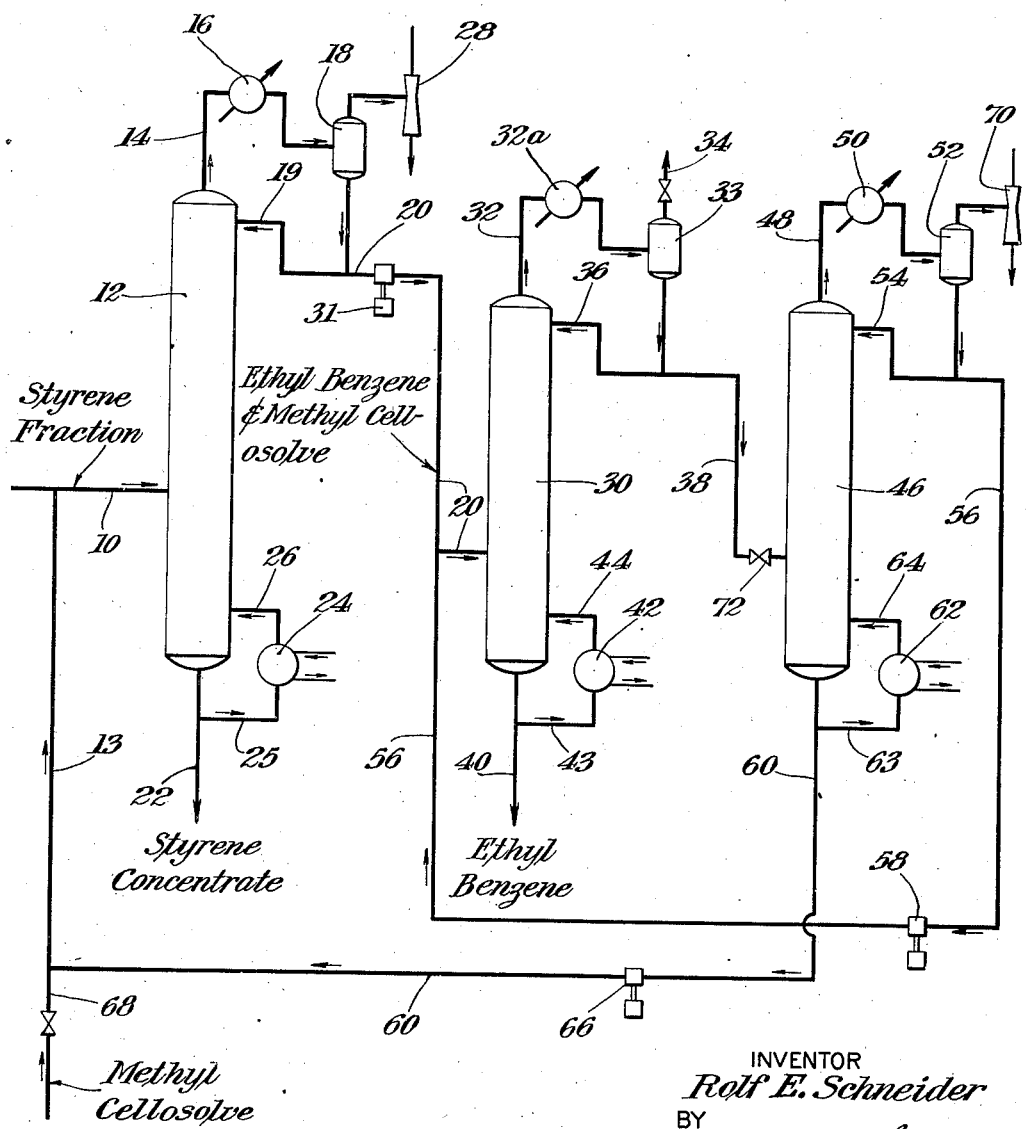
INVENTOR
Rolf E. Schneider
BY
M. D. Pickens
ATTORNEY

Patented Sept. 18, 1945

2,385,235

UNITED STATES PATENT OFFICE 2,385,235

STYRENE DISTILLATION

Rolf E. Schneider, Jackson Heights, N. Y., assignor to The Lummus Company, New York, N. Y., a corporation of Delaware Application October 26, 1942, Serial No. 463,348

4 Claims. (Cl. 202—42)

This invention relates to azeotropic distillation and particularly to the recovery of the azeotrope-forming agent or entrainer used in such distillation. This application is an improvement on the prior copending application of Ward J. Bloomer, S. N. 430,147, filed February 9, 1942, which application has matured into Patent No. 2,380,019, issued July 10, 1945.

In the prior application referred to above, there is disclosed a procedure for recovering concentrated styrene by means of azeotropic distillation of a styrene-containing mixture in the presence of particular entrainers whereby the hydrocarbons having boiling points close to that of styrene are separated as an overhead in the form of substantially a binary azeotrope with the entrainer. Such an entrainer is preferably soluble in the hydrocarbons which have been separated from the crude styrene fraction, and for economic reasons it is desirable to recover the entrainer from such solution for reuse. Washing or leaching of the entrainer from the hydrocarbon solution with a solvent that dissolves substantially only the entrainer has been proposed. The use of such a procedure is generally disadvantageous, however, since, in the separation of the solvent from most of the entrainers, an azeotrope of the solvent with the entrainer is formed and a complex system for recovering the entrainer is then necessary.

It is the primary object of my invention to provide an improved method for recovering the azeotrope-forming agent or entrainer used in the separation of a particular component from admixture with other close-boiling components by azeotropic distillation.

It is another object of my invention to provide an improved procedure for utilizing the change in the composition of the azeotropic mixture with pressure in the recovery of the entrainer used to separate styrene, toluene, or the like from admixture with like-boiling hydrocarbons by azeotropic distillation.

Further objects and advantages of my invention will be apparent from the following description thereof taken in connection with the attached drawing illustrative thereof.

In one embodiment of my invention, the mixture of like-boiling constituents containing the component to be separated therefrom in a more concentrated form may be conveniently introduced through line 10 into distillation tower 12. Such a mixture may comprise a fraction of primarily close-boiling aromatic hydrocarbons containing styrene in a relatively low concentration. This crude styrene mixture may comprise, for example, the product obtained by the dehydrogenation of ethyl benzene to styrene, or it may comprise a styrene-containing fraction obtained from the drip oil recovered in the manufacture of artificial gas or from the coal tar distillate produced in the coking of coal.

It will be appreciated that the composition of the dilute styrene fraction to be concentrated will depend on its source and on the prior treatment to which it has been subjected. A typical example of the product formed in the dehydrogenation of ethyl benzene to styrene may have the following composition:

|  | Weight percentage | B. P., °F. |
|---|---|---|
| Benzene | 7.3 | 176.2 |
| Toluene | 5.5 | 231.1 |
| Ethyl benzene | 62.2 | 277.2 |
| Styrene | 20.3 | 294.8 |
| Higher boiling components | 4.8 | |

The approximate composition of a typical styrene-containing fraction obtained from the light oil distillate produced in the coking of coal may be as follows:

|  | Weight percentage | B. P., °F. |
|---|---|---|
| Ethyl benzene | 2 | 277.2 |
| Paraxylene | 13 | 281.1 |
| Metaxylene | 35 | 282.7 |
| Orthoxylene | 5 | 288.9 |
| Styrene | 27 | 294.8 |
| Propyl benzenes | 10 | 307–316 |
| Trimethyl benzenes | 2 | 328 |
| Olefins | 5 | 356–401 |
| Paraffins | 2 | 356–401 |
| Higher boiling components | Less than 1 | |

Since the styrene in such a fraction is admixed with other hydrocarbon materials of like boiling point, it is substantially impossible to recover the styrene in a highly concentrated condition by ordinary distillation methods. For example, the concentrated fraction obtained by subjecting a crude styrene fraction to ordinary distillation even under a relatively high vacuum contains approximately only 55% styrene by volume. This concentration limitation is also based to some extent on the distillation temperatures to which styrene can be subjected, for styrene tends to polymerize at an increased rate as the temperature is increased. Accordingly, azeotropic distillation is desirably resorted to for the separation of styrene from such a mixture as disclosed in the prior copending application of Bloomer, S. N. 430,147. Among the materials which have been found suitable for such purpose are the lower fatty acids, particularly acetic acid (boiling point, 244.8° F.), the normally liquid aliphatic alcohols such as butyl alcohol (boiling point, 243.9° F.), the ethylene glycol ethers, particularly "methyl cellosolve" (ethylene glycol monomethyl ether—boiling point, 255.7° F.), "cellosolve" (ethylene glycol monoethyl ether—boiling point, 275.8° F.), "butyl cellosolve" (ethylene glycol monobutyl ether—boiling point, 339.1° F.), "methyl carbitol" (di-ethylene glycol monomethyl ether—boiling point, 379.8° F.), "carbitol" (di-ethylene glycol monoethyl ether—boiling point, 395.4° F.) and "diethyl carbitol" (boiling point, 370.2° F.), esters of ethylene glycol ethers such as "methyl cellosolve acetate" (boiling point, 292.1° F.) and "cellosolve acetate" (boiling point, 307.4° F.), and other polar oxygen-containing organic compounds. Particular success has been had in the use of the "cellosolves," especially "methyl cellosolve," for this purpose.

For convenience only, my invention will be described in connection with the azeotropic distillation of a crude styrene fraction in the presence of "methyl cellosolve" as the entrainer to obtain a highly concentrated styrene product wherein the crude styrene fraction has been obtained by the dehydrogenation of ethyl benzene.

The necessary amount of "methyl cellosolve" to effect the desired azeotropic separation is added through line 13 to the incoming crude styrene fraction. In tower 12 this crude styrene fraction is distilled in the presence of the "methyl cellosolve," which forms an azeotropic mixture with a major portion of the like-boiling hydrocarbons associated with the styrene. This azeotropic mixture is removed overhead through line 14 for condensation in condenser 16, the condensate from which is collected in accumulator 18. A portion of the resulting condensate is returned as reflux to tower 12 through line 19, and the remainder of this condensate is passed through line 20 for recovery of the "methyl cellosolve" as will be hereinafter more particularly described. The styrene concentrate is removed from tower 12 through bottoms line 22 and may be used as such or may be separated from the remaining primarily higher boiling hydrocarbons in any appropriate manner.

Heat is supplied to tower 12 by means of a reboiler 24, through which a portion of the bottoms from the tower is circulated as by means of lines 25 and 26. Tower 12 is desirably operated under a vacuum, for example, on the order of 100 mm. Hg absolute pressure, in order to prevent undue polymerization of the styrene because of heating and other side reactions; and the necessary vacuum may conveniently be produced by a jet ejector 28 or the like in communication with accumulator 18. The operating conditions are also desirably so maintained that substantially no styrene or, at the most, only a minimum amount of styrene appears in the overhead vapors from tower 12.

In accordance with my invention, the azeotropic overhead condensate from tower 12 is introduced through line 20 into the primary high pressure azeotropic distillation column 30 as by means of pump 31. In the treatment of the particular styrene fraction mentioned, this overhead condensate comprises a binary azeotropic mixture of "methyl cellosolve" and hydrocarbons consisting for the most part of ethyl benzene. This azeotropic mixture is subjected to distillation in column 30, wherein a separation is effected between ethyl benzene and a binary azeotrope of "methyl cellosolve" and ethyl benzene. This methyl cellosolve-ethyl benzene azeotrope is removed overhead from column 30 through line 32 for condensation in condenser 32a, the condensate from which is collected in accumulator 33. Desirably, this accumulator is provided with valved vent line 34. A portion of this resulting condensate is returned as reflux for column 30 through line 36, and the remainder is removed through line 38. The effect of the operation in column 30 is to provide the first step in the breaking up of the binary azeotrope condensate of "methyl cellosolve" and ethyl benzene so that the "methyl cellosolve" can be readily recovered for reuse as the entrainer in the azeotropic concentration of the crude styrene fraction and so that the separated ethyl benzene can be eliminated from the system without resort to a complex recovery system.

The operating conditions in column 30 are desirably so maintained that ethyl benzene substantially free of "methyl cellosolve" is removed through bottoms line 40 therefrom. This ethyl benzene may be disposed of as desired and may be subjected to dehydrogenation for the further production of styrene. Heat may be supplied to column 30 as by means of reboiler 42, through which a portion of the bottoms stream is circulated as by means of lines 43 and 44.

In accordance with my invention, column 30 is desirably operated at atmospheric or superatmospheric pressure since a considerable increase in the absolute pressure of distillation permits a substantial portion of the incoming ethyl benzene to be removed free of "methyl cellosolve" through the bottoms line 40. This result is obtained because, upon an increase in absolute pressure, the percentage of "methyl cellosolve" in the azeotrope of "methyl cellosolve" and ethyl benzene increases. Any desired absolute pressure may be maintained on column 30, and atmospheric pressure may be used if it is found to be most convenient and economic to do so.

The "methyl cellosolve"-ethyl benzene azeotrope condensate in line 38 is desirably introduced into the secondary low pressure azeotropic distillation column 46 for the recovery of the "methyl cellosolve" contained therein. In this column a separation is effected between "methyl cellosolve" and a binary azeotrope of "methyl cellosolve" and ethyl benzene. This azeotrope is removed from column 46 through overhead line 48 for condensation in condenser 50. The resulting condensate is collected in accumulator 52, from which a portion of the condensate is returned through line 54 to column 46 as reflux. The remainder of the condensate is returned to column 30 through line 56 as by means of pump 58 for recovery of the remaining "methyl cellosolve" therein. This recycled condensate is desirably introduced into column 30 at a point in accordance with its composition. The effect of the operation in column 46 is to provide the second step in the breaking up of the "methyl cellosolve"-ethyl benzene azeotrope removed overhead from tower 12.

Operating conditions in column 46 are preferably maintained such that "methyl cellosolve" free of ethyl benzene is removed therefrom through bottoms line 60. To supply heat to column 46, a portion of this bottoms stream may be circulated through reboiler 62 as by means of lines 63 and 64. The ethyl benzene-free "methyl cellosolve" is returned to tower 12 through lines 60 and 13 as by means of pump 66 for use in the production of further styrene-containing concentrate. Provision may be made as at 68 for the introduction of additional "methyl cellosolve" to make up for any losses occurring in the system.

According to my invention, column 46 is maintained under a lower absolute pressure than that maintained on column 30 and preferably under a vacuum. In this way, a substantial portion of the "methyl cellosolve" appears in bottoms line 60 since, with a decrease in the absolute pressure, the percentage of "methyl cellosolve" in the methyl cellosolve-ethyl benzene azeotrope decreases. Any degree of vacuum may be maintained on column 46, and the absolute pressure in column 46 may or may not be the same as that in tower 12. The necessary vacuum may be produced by means of a jet ejector 70 or the like in communication with accumulator 52. In addition, valve 72 is provided in line 38 so that the desired vacuum in column 46 may be continuously maintained and so that the feed rate to column 46 may be suitably controlled.

By means of this procedure, I am enabled to recover the entrainer utilized in the azeotropic distillation and concentration of crude styrene fractions without the requirement of washing or leaching the entrainer from its azeotropic solution with the close-boiling hydrocarbons. The use of a highly complex system for the separation of the washing or leaching agent from its solution with the entrainer is no longer necessary. The entrainer is recovered substantially free of the close-boiling hydrocarbons and is continuously returned in a closed cycle for reuse in the styrene distillation.

The following application of my invention will illustrate its operation. A crude styrene fraction obtained by the dehydrogenation of ethyl benzene is admixed with "methyl cellosolve" and is subjected to azeotropic distillation in tower 12 in accordance with the disclosure of the copending application of Bloomer, S. N. 430,147, to produce a styrene concentrate which is removed through bottoms line 22. An absolute pressure of about 62 mm. Hg is maintained at the top of tower 12, and a binary azeotropic overhead condensate containing approximately 59.6% ethyl benzene and 40.4% "methyl cellosolve" by volume is obtained. The temperature of the overhead binary vapors at this pressure is approximately 120° F. This condensate is passed to the primary azeotropic distillation column 30, wherein it is distilled under substantially atmospheric pressure for the separation of ethyl benzene. A bottoms stream comprising ethyl benzene substantially free of "methyl cellosolve" is produced and is removed through line 40 for use as desired. On the basis of 100 gallons of charge per hour to column 30, 59.6 gallons of ethyl benzene per hour are removed through line 40. The binary azeotrope overhead from column 30 contains about 48.8% ethyl benzene and 51.2% "methyl cellosolve" by volume or 109.4 gallons of ethyl benzene and 114.7 gallons of "methyl cellosolve" per hour. At atmospheric pressure the temperature of these binary overhead vapors is approximately 242° F. This binary overhead is condensed, and the resulting condensate is introduced into the secondary azeotropic distillation column 46, which is operated under a vacuum that may conveniently be the same as that maintained on the styrene distillation tower 12. A bottoms stream comprising "methyl cellosolve" substantially free of ethyl benzene is removed through bottoms line 60 at the rate of 40.4 gallons per hour and is desirably recycled through lines 60 and 13 to distillation tower 12 for reuse therein. The binary azeotrope overhead of column 46 has approximately the same composition as the binary azeotrope removed overhead from the tower 12 and amounts to about 109.4 gallons of ethyl benzene and 74.3 gallons of "methyl cellosolve" per hour. The temperature of these binary vapors at this subatmospheric pressure is approximately 120° F. This latter binary overhead is condensed, and the condensate is returned to the primary atmospheric column 30 for ultimate separation of the remaining ethyl benzene and ultimate recovery of the remaining "methyl cellosolve." An effective separation of the initial ethyl benzene-"methyl cellosolve" azeotrope can thus be made with a relatively small number of decks. The precise reason for this result is not well known, but it appears that the azeotropic distillation itself is the principal cause.

In the application of my invention to the separation of a styrene-containing fraction derived from the light oil distillate obtained from the coking of coal, the separation in tower 12 is primarily between the xylenes and styrene. With "methyl cellosolve" as the entrainer, the overhead vapors from tower 12 comprise substantially a binary azeotrope of xylenes and "methyl cellosolve." Other primarily aromatic hydrocarbons such as ethyl benzene and the propyl benzenes are admixed with the xylenes; but the xylenes comprise the greater portion of the hydrocarbons in this binary azeotrope. The overhead condensate from tower 12 is then fractionated in the primary azeotropic column 30, from the bottom of which xylenes substantially free of "methyl cellosolve" are removed. The overhead vapors from column 30 comprise an azeotrope of "methyl cellosolve" and xylenes containing a greater portion of "methyl cellosolve." The resulting overhead condensate is then introduced into the secondary vacuum column 46, from the bottom of which "methyl cellosolve" substantially free of xylenes is removed. The overhead azeotrope of xylenes and "methyl cellosolve" from this column is returned to the primary column 30 for the further separation of the xylenes from the "methyl cellosolve" contained therein.

The recovery of entrainers used in the azeotropic concentration of other polymerizable vinyl aromatic compounds is also within the scope of my invention. Such compounds include methyl styrene, chlorinated derivatives of styrene, and the like.

My invention is also applicable to the azeotropic concentration of toluene from its admixture with close-boiling primarily paraffinic hydrocarbons. Heretofore, only such entrainers as methyl alcohol and the like have been employed in this azeotropic separation because it has been considered necessary to recover the entrainer by washing or leaching and because of the complex system required for the recovery of those entrainers which form an azeotrope with the medium such as water used to wash the entrainer from its solution with the hydrocarbons separated from the toluene. By means of my invention, such limitations are entirely removed, and the use of other entrainers is possible. It is to be noted that the use of many of these entrainers is very desirable in that a greater hydrocarbon to entrainer ratio in the azeotrope is obtained.

When such a toluene-containing fraction is being concentrated in accordance with my invention by means of azeotropic distillation in the presence of a suitable entrainer such as acetic acid, "methyl cellosolve," or the like, the binary azeotrope removed overhead from tower 12 contains primarily paraffinic hydrocarbons and the entrainer. This binary azeotrope is then fractionated in primary atmospheric column 30, from the bottom of which the paraffinic hydrocarbons are removed substantially free of the entrainer for use as desired. The overhead from column 30 comprises a binary azeotrope of the entrainer and the paraffinic hydrocarbons containing a greater proportion of the entrainer. Upon condensation, this azeotrope is introduced into the secondary vacuum column 46. The entrainer substantially free of paraffinic hydrocarbons is removed from the bottom of this column and is recycled to tower 12 for reuse therein. The binary overhead azeotrope of the entrainer and the paraffinic hydrocarbons containing a greater proportion of the latter is returned to the primary column 30 for further separation into entrainer and paraffinic hydrocarbons.

The application of my invention is not limited to the particular examples described herein. It is applicable to the recovery of the entrainer used in the azeotropic concentration of a particular component from any mixture of close-boiling components in which such entrainer is soluble. In the recovery of this entrainer by means of my improved procedure, the close-boiling components should form substantially a minimum-boiling binary azeotrope with the entrainer, which azeotrope will have a lower boiling point than the entrainer. The nature of the azeotrope should also be such that, as the absolute pressure of distillation is increased, the percentage of entrainer in the azeotrope substantially increases.

It is to be noted that the percentage of entrainer in the feed to column 30 is on the low side of that in the binary atmospheric azeotrope. This result follows because of the nature of the operation in tower 12, which is necessarily maintained under a different and preferably a lower pressure than that on column 30.

It will also be apparent that my invention is applicable to the breaking up of a binary azeotrope whose components have the above characteristics.

My invention is also not limited to the use of a vacuum in tower 12 and to the use of a vacuum in column 46 and of atmospheric pressure in column 30. Any suitable pressure may be used in tower 12, and any suitable pressures may be used in columns 46 and 30. In the operation of the latter two columns, however, the pressures in each should be different, and the pressure in column 30 should be sufficiently greater than that in column 46 so that a noticeable shift in the composition of the entrainer-close-boiling components binary takes place. The particular pressure employed in column 30 is governed primarily by the greater advantage to be gained in operating at such pressure.

Although I have described a preferred procedure for carrying out my invention, it will be apparent that modifications may be made thereto. Accordingly, only such limitations as appear in the claims appended hereinafter should be applied.

I claim:

1. In the method of separating styrene from a mixture thereof with close-boiling aromatic hydrocarbons primarily selected from the group consisting of ethyl benzene and the xylenes wherein the mixture is subjected to a binary azeotropic distillation in the presence of an entrainer comprising an ethylene glycol lower alkyl ether, a styrene concentrate is removed as the bottoms stream from such distillation, and a binary azeotrope comprising the aromatic hydrocarbon and the ethylene glycol lower alkyl ether is removed as the overhead therefrom, the method of recovering the ethylene glycol lower alkyl ether from such binary azeotropic overhead, which comprises subjecting such binary azeotropic overhead to a primary binary azeotropic distillation, removing the aromatic hydrocarbon substantially free of the ethylene glycol lower alkyl ether as the bottoms stream from this primary binary distillation, removing a binary azeotrope comprising the ethylene glycol lower alkyl ether and aromatic hydrocarbon as the overhead from this primary binary distillation, subjecting this latter overhead to a secondary binary azeotropic distillation, removing a binary azeotrope comprising the aromatic hydrocarbon and ethylene glycol lower alkyl ether as the overhead from this secondary binary distillation, maintaining the pressure on the primary binary distillation higher than that maintained on the secondary binary distillation whereby the percentage of ethylene glycol lower alkyl ether in the primary binary azeotrope is greater than that in the secondary binary azeotrope, the pressure maintained on the primary binary distillation being higher than that maintained on the styrene azeotropic distillation, returning this secondary binary azeotrope to the primary binary distillation for ultimate separation of the ethylene glycol lower alkyl ether from the aromatic hydrocarbon, removing the ethylene glycol lower alkyl ether substantially free of aromatic hydrocarbon as the bottoms stream from this secondary binary distillation, and recycling this separated ethylene glycol lower alkyl ether to the azeotropic styrene distillation for reuse therein.

2. The method as claimed in claim 1, in which the ethylene glycol lower alkyl ether comprises ethylene glycol monomethyl ether.

3. The method as claimed in claim 1, in which the secondary binary azeotropic distillation is conducted at the same pressure as the azeotropic styrene distillation.

4. The method as claimed in claim 1, which includes conducting the primary binary azeotropic distillation at a pressure range from atmospheric to superatmospheric and conducting the secondary binary azeotropic distillation at a subatmospheric pressure.

ROLF E. SCHNEIDER.